Patented Feb. 23, 1943

UNITED STATES PATENT OFFICE 2,312,214

STABLE FORMALDEHYDE-UREA COMPOSITION CONTAINING A HARDENER

Arthur M. Howald and William C. Dearing, Toledo, Ohio

No Drawing. Application December 29, 1941, Serial No. 424,798

5 Claims. (Cl. 260—71)

The invention relates to a stable dry mixture of a hardenable water-soluble formaldehyde-urea reaction product with a hardener therefor, which can be used as an adhesive or coating composition upon addition of water.

An aqueous solution of a formaldehyde-urea reaction product is valuable as an adhesive or a coating composition, because the reaction product in such a solution can be caused to become insoluble after the solution has been applied, to produce a water-resistant adhesive bond or surface coating. A formaldehyde-urea reaction product in aqueous solution is superior to other resin-formers in the ease and rapidity with which it can be converted into the insoluble state after being applied. Plywood that has been glued with an aqueous solution of a formaldehyde-urea reaction product, unlike plywood that has been glued with other thermosetting adhesives, does not need to be subjected to an elevated temperature in a heated press in order to convert the formaldehyde-urea reaction product into the insoluble resin.

Expensive hot-pressing equipment is not necessary when an aqueous solution of a formaldehyde-urea reaction product is used as an adhesive, because such an adhesive, after being applied, can be converted at ordinary temperatures into an insoluble resinous bond by the action of a hardening agent that renders the composition acid and thus causes the formaldehyde-urea reaction product to harden or become insoluble. The hardening agents heretofore used in ordinary commercial practice are ammonium chloride and ammonium thiocyanate, which are not strongly acid in themselves, but which react with the free formaldehyde that is present in an aqueous solution of a formaldehyde-urea reaction product to form strongly acid hexamethylenetetramine salts. When an aqueous solution of a formaldehyde-urea reaction product is used as an adhesive or a coating composition, such a hardening agent cannot be added until just before the composition is applied, because the gelling or conversion of the formaldehyde-urea reaction product into an insoluble resin begins as soon as the hardening agent is added. Therefore, it has been necessary to ship the formaldehyde-urea reaction product and the hardening agent in separate containers, and to rely upon the user to add the correct proportion of hardening agent just before the solution of the formaldehyde-urea reaction product is applied.

Water - soluble formaldehyde - urea reaction products for use as adhesives are sold commercially both in dry form and in the form of aqueous solutions. When a formaldehyde-urea reaction product that has been shipped in dry form is to be used as an adhesive, water is added by the user to obtain an aqueous solution of the desired dilution. Both in the case of a formaldehyde-urea adhesive that has been purchased in the form of a solution, and in the case of an adhesive solution that the user has prepared by adding water to a dry formaldehyde-urea reaction product, it has not been possible to add the hardening agent to the formaldehyde-urea reaction product until just before the adhesive was to be applied.

The necessity for shipping the formaldehyde-urea reaction product and the hardening agent in separate containers has been a severe handicap in the development of the formaldehyde-urea adhesive industry. It has been impossible to furnish formaldehyde-urea adhesives for domestic use, because there are no facilities in the ordinary home for measuring out the exact amount of hardening agent required for use with a given quantity of a water-soluble formaldehyde-urea adhesive. Many small industrial establishments do not have sufficiently accurate weighing equipment for measuring out the proper amount of hardening agent for use with a formaldehyde-urea adhesive. Moreover, through carelessness or oversight, a workman sometimes forgets to add any hardening agent, or adds the hardening agent twice to the same batch. In either case, the entire batch of adhesive is spoiled.

Accurate measurement of the amount of hardening agent to be added to a given quantity of a water-soluble formaldehyde-urea adhesive is important. If too much hardening agent is added, the adhesive may gel or harden so rapidly that there is no time for applying it. If too little hardening agent is added, the adhesive will not harden properly, and will not produce a satisfactory bond.

An industrial user of a formaldehyde-urea adhesive ordinarily purchases a 100-pound container of the adhesive as a minimum quantity, even though it may take several days to use up 100 pounds of the adhesive. Although there may be supplied, along with the 100-pound container of the adhesive, a separate container holding the proper amount of hardening agent for use with 100 pounds of the adhesive, any of the adhesive to which hardening agent has been added must be used up immediately, before it gels and becomes insoluble. Therefore, the user removes a portion of the adhesive from the 100-pound container each day, and adds a measured portion of the hardening agent.

If a dry mixture of ammonium chloride with a water-soluble formaldehyde-urea reaction product could be sold to users of adhesives, the users would not be required to add the hardening agent, and there would be no more difficulties arising from incorrect measurement of the hardening agent by users, or failure to add the hardening agent. However, it has been found that dry ammonium chloride or ammonium thiocyanate, when mixed with a dry water-soluble formaldehyde-urea reaction product, causes rapid hardening of the reaction product, even in the dry state, and the mixture soon becomes insoluble and worthless.

The principal object of the invention is to provide a stable dry mixture of a hardenable water-soluble formaldehyde-urea reaction product with a hardener of maximum effectiveness, which mixture, upon addition of water, forms a self-hardening adhesive or coating composition. More specific objects and advantages are apparent from the description, which merely discloses and illustrates the invention and is not intended to impose limitations upon the claims.

A stable dry mixture of an adhesive and a hardener therefor, embodying the invention, comprises a hardenable water-soluble formaldehyde-urea reaction product, ammonium sulphate, and the chloride of an alkaline earth metal. This mixture of a dry formaldehyde-urea reaction product and a dry hardener therefor is stable over long periods of time. Its stability is not appreciably different from the stability of a dry formaldehyde-urea reaction product alone containing no hardening agent. Upon addition of water to the mixture, however, a self-hardening adhesive solution is formed. The addition of water causes the mixture to dissolve, and the chloride of the alkaline earth metal immediately reacts with the ammonium sulphate to produce ammonium chloride and the sulphate of the alkaline earth metal. Since the sulphate of the alkaline earth metal is insoluble, it immediately precipitates from the solution, and thereafter forms an inert ingredient of the composition. The adhesive solution obtained by adding water to a stable dry mixture embodying the invention can be made to harden with any desired rapidity by varying the amount of ammonium sulphate in the dry mixture.

Although a dry mixture of ammonium sulfate with a hardenable water-soluble formaldehyde-urea reaction product is stable, it has now been discovered that ammonium sulphate is not as effective a hardening agent as ammonium chloride, and that the maximum bond strength that can be obtained by using ammonium sulphate as the hardening agent in a formaldehyde-urea adhesive is substantially less than the maximum bond strength that can be obtained by using ammonium chloride as the hardening agent. The present invention thus takes advantage of the stability of a dry mixture of ammonium sulphate with a formaldehyde-urea reaction product, and also takes advantage of the superior effectiveness of ammonium chloride as a hardening agent, by causing the ammonium sulphatae to be converted into ammonium chloride as soon as an adhesive solution is prepared by adding water to the dry mixture.

A stable dry mixture embodying the invention is suitable for domestic use as an adhesive, because a self-hardening adhesive is obtained by simply adding water to the mixture. The batch of adhesive solution prepared from the dry mixture may be as small or as large as desired, and it always contains the correct proportion of hardening agent.

Since the hardening agent is already contained in a mixture embodying the invention, it is not necessary for the user to weigh out successive portions of hardening agent as successive portions of adhesive are removed from the container. Each batch of adhesive solution can be made up as it is needed, by simply removing the desired amount of the dry mixture from the container and dissolving it in water.

A stable dry composition embodying the invention, for use as a water paint, can be prepared by incorporating a pigment in the mixture along with the hardenable water-soluble formaldehyde-urea reaction product and the hardener. Upon addition of water to such a mixture, a self-hardening coating composition is obtained.

In a dry mixture embodying the invention, for use as a water paint, the pigment is preferably dispersed intimately throughout the formaldehyde-urea reaction product. If desired, the pigment and formaldehyde-urea reaction product may be mixed dry; for example, by grinding them together in a ball mill. However, a dispersion of the pigment in the solid formaldehyde-urea reaction product is preferably prepared by first dispersing the pigment in an aqueous solution of the formaldehyde-urea reaction product and then evaporating the resulting dispersion in a suitable apparatus such as a spray-drier or vacuum drum drier. Before the dispersion is evaporated, a non-volatile water-soluble organic solvent such as ethylene glycol may be added to serve as a plasticizer in the composition. A dispersion of the pigment in a solution of the formaldehyde-urea reaction product, suitable for spray-drying or vacuum drum-drying, may be prepared by means of a dispersing apparatus such as a ball mill, roller mill, or colloid mill.

The amount of pigment used in the composition depends upon whether a glossy finish or a flat finish is desired. A glossy finish can be obtained by the use of approximately equal parts by weight of pigment and formaldehyde-urea reaction product, and a flat finish can be obtained by the use of a greater proportion of pigment.

As used herein, the term "dry mixture" means a composition that is dry to the touch. A formaldehyde-urea reaction product that is dry to the touch, such as the product obtained by spray-drying an aqueous solution of a formaldehyde-urea condensation product, may contain 1 per cent or more of moisture, and such amounts of moisture do not affect the stability of a mixture embodying the invention. A dry mixture embodying the invention is preferably in granular or powdered form, so that it will dissolve rapidly upon the addition of water.

In the preparation of a dry mixture embodying the invention, for use as an adhesive, crystals of the ammonium sulphate and metal chloride may simply be mixed with the granular or powdered formaldehyde-urea reaction product. In the preparation of a dry mixture for use as a water paint, an intimate dispersion of the pigment in the formaldehyde-urea reaction product may first be prepared in the form of powder or granules and then mixed with the crystals of the ammonium sulphate and metal chloride. Preferably, the composition is not ground in a ball mill or other pulverizing apparatus after the ammonium sulphate has been added to the formaldehyde-urea reaction product.

An aqueous solution prepared by adding water to a dry mixture embodying the invention is not strongly acid at first, but gradually becomes more and more acid. The ammonium chloride formed by reaction of the metal chloride with the ammonium sulphate gradually "extracts" formaldehyde from the formaldehyde-urea reaction product, and the reaction of such formaldehyde with the ammonium chloride produces hexamethylenetetramine chloride, which is much more acid than ammonium chloride. Since the composition becomes more and more acid by conversion of the ammonium salt into a hexamethylenetetramine salt, the hardening of the formaldehyde-urea reaction product accelerates after the composition has been applied, and causes the adhesive bond or surface coating to become insoluble after a relatively short period of time.

The proportion of ammonium sulphate in a dry mixture embodying the invention is simply the proportion that will cause the formaldehyde-urea reaction product to harden with the desired rapidity after water has been added. The proportion of the chloride of the alkaline earth metal in a dry mixture embodying the invention may be as small as desired, because any amount of the metal chloride causes some of the ammonium sulphate to be converted into ammonium chloride upon addition of water, and thus causes the hardening to take place more effectively. Any excess of the metal chloride above the chemical equivalent of the ammonium sulphate is substantially inert in the composition. Barium chloride and strontium chloride are preferable to calcium chloride, because they are nonhygroscopic and are more nearly neutral than calcium chloride, and because the corresponding sulphates are more insoluble.

A water-soluble formaldehyde-urea reaction product for use in a composition embodying the invention is most readily obtained by reacting formaldehyde and urea in an aqueous solution. If the reaction is carried too far, the formaldehyde-urea reaction product will precipitate upon dilution of the resulting solution. In the preparation of a dry mixture for use as a water paint, a formaldehyde-urea reaction product should be employed that will not precipitate when sufficient water is added to the dry mixture to produce a composition of a consistency suited to the method by which it is to be applied, such as brushing or spraying.

A water-soluble formaldehyde-urea reaction product for use in a composition embodying the invention may be prepared as follows: 1 mol of urea is added to a 37 per cent aqueous solution containing 2 mols of formaldehyde that has been brough to pH 4.5-5.5 by means of sodium hydroxide. The solution is then gently refluxed long enough (about 1 hour) to carry the reaction to a suitable stage, after which the solution is neutralized. It may then be evaporated by spray-drying or vacuum drum-drying, to produce a solid product.

The formaldehyde-urea reaction product should be prepared in a substantially neutral condition; for example, by neutralization of the initial aqueous solution of the reaction product prior to evaporation, as in the foregoing procedure. A dry formaldehyde-urea reaction product that is markedly acid is not desirable, because such a reaction product is unstable even when no hardening agent is added to it.

*Example 1*

A spray-dried formaldehyde-urea reaction product is prepared in accordance with the foregoing procedure without the addition of any pigment. 2½ parts of dry ammonium sulphate and 4 parts of barium chloride are mixed with 100 parts of the spray-dried formaldehyde-urea reaction product. Fillers or extenders may be added if desired. The resulting dry mixture forms a self-hardening adhesive or impregnating composition upon addition of sufficient water to produce a solution of the desired consistency. Only a very slight precipitate of barium sulphate is formed upon the addition of water. An adhesive prepared in accordance with this example, like other formaldehyde-urea adhesive solutions, is quite viscous, to provide the necessary tackiness, so that the precipitate of barium sulphate stays in suspension. Assembled parts that have been glued with this adhesive may be held at ordinary temperatures while the adhesive hardens. Plywood panels and similar articles may be placed under pressure during the hardening of the adhesive. If desired, a heated press may be used to secure quick hardening of the panels, or the panels may simply be clamped together and stored at an elevated temperature to hasten the hardening.

*Example 2*

An aqueous solution containing 100 parts of a formaldehyde-urea reaction product is prepared in accordance with the foregoing procedure, and a roller mill is used to disperse 100 parts of titanium oxide pigment in the solution. After the addition of 1 part of ethylene glycol as a plasticizer, the resulting dispersion is evaporated in a spray-drier, and 2½ parts of dry ammonium sulphate and 4 parts of barium chloride are mixed with 200 parts of the spray-dried product. A water paint can be prepared by adding water to the resulting mixture until the desired consistency is attained. The resulting paint dries rapidly, and is dry to the touch about 1 hour after it is applied. A few days after the application of the coating, it is insoluble or washable. The coating does not dust off, and resembles an oil paint. The slight precipitate of barium sulphate is indistinguishable in a coating composition, because it is completely obscured by any pigment that is used.

Various embodiments of the invention may be devised to meet various requirements.

We claim:

1. A stable dry mixture comprising a hardenable water-soluble formaldehyde-urea reaction product, ammonium sulphate and the chloride of an alkaline earth metal, said mixture, upon addition of water, forming a self-hardening composition.

2. A stable dry mixture comprising a pigment, a hardenable water-soluble formaldehyde-urea reaction product, ammonium sulphate and the chloride of an alkaline earth metal, said mixture, upon addition of water, forming a self-hardening composition.

3. A stable dry mixture comprising a hardenable water-soluble formaldehyde-urea reaction product, ammonium sulphate and barium chloride, said mixture, upon addition of water, forming a self-hardening composition.

4. A stable dry mixture comprising a hardenable water-soluble formaldehyde-urea reaction product, ammonium sulphate and strontium chloride, said mixture, upon addition of water, forming a self-hardening composition.

5. A stable dry mixture comprising a dispersion of a pigment in a solid, hardenable water-soluble formaldehyde-urea reaction product, in admixture with ammonium sulphate and barium chloride, said mixture, upon addition of water, forming a self-hardening composition.

ARTHUR M. HOWALD.
WILLIAM C. DEARING.